INVENTOR
Leslie Thomas Spurin
By
Attorney.

July 3, 1951 L. T. SPURIN 2,559,233
AIRCRAFT REFUELING PLANT
Filed Sept. 24, 1945 4 Sheets-Sheet 3

INVENTOR
Leslie Thomas Spurin
By A. G. Odell
ATTORNEY

July 3, 1951 L. T. SPURIN 2,559,233
AIRCRAFT REFUELING PLANT
Filed Sept. 24, 1945 4 Sheets-Sheet 4

INVENTOR
Leslie Thomas Spurin
BY A. E. O'Dell
ATTORNEY

Patented July 3, 1951

2,559,233

UNITED STATES PATENT OFFICE 2,559,233

AIRCRAFT REFUELING PLANT

Leslie Thomas Spurin, Slough, England, assignor to Zwicky Limited, Slough, England, a British company Application September 24, 1945, Serial No. 618,078
In Great Britain May 6, 1944

Section 1, Public Law 690, August 8, 1946
Patent expires May 6, 1964

13 Claims. (Cl. 222—533)

This invention relates to replenishing plant, particularly for aircraft, and especially to replenishing plant carried upon a tanker vehicle.

As at present constructed refuelling tanker vehicles, in addition to the fuel tank and the engine and transmission gear for driving the vehicle, include pumps which may be driven by the vehicle engine or by an independent power unit, one or more booms on the top of the vehicle by which a flexible filling hose may be lifted to an aircraft tank, and the requisite valves and other control apparatus to enable the pumps to fill the tank from a reservoir or to supply the elevated hoses from the tank.

One object of the present invention is a traveling replenishing plant having a hollow boom rotatable about both a horizontal and a vertical axis and itself forming a conduit for fuel or other liquid. A single replenishing unit may include more than one such boom. The replenishing plant of the invention is applicable not only for refuelling, but also for supplying other liquids, as lubricating oil and cooling fluid; and a replenishing unit may include a tank and hollow boom for each such liquid.

A further object of the invention is a replenishing unit having a hollow boom, through which liquid is supplied, mounted to rotate about vertical and horizontal axes, and having spring elevator means which at least in part counterbalance, and preferably more than counterbalance, the gravitational torque of the boom about its horizontal axis so that it is biased towards its raised position.

Yet another object of the invention is a replenishing unit having a hollow boom, through which liquid is supplied, mounted to rotate about vertical and horizontal axes, and having means for restraining the swing of the boom about its vertical axis.

Other objects of the invention will appear from the following description of an example of the invention and from the appended claims.

Where mobility is not of importance the boom may be mounted upon a column erected on the ground beside an underground tank or other reservoir; but as a rule tank and boom will be borne on a vehicle; for use with marine aircraft the vehicle may be a boat.

A construction of mobile replenishing plant embodying the invention is illustrated by way of example in the accompanying drawings. In these:

Figure 1:
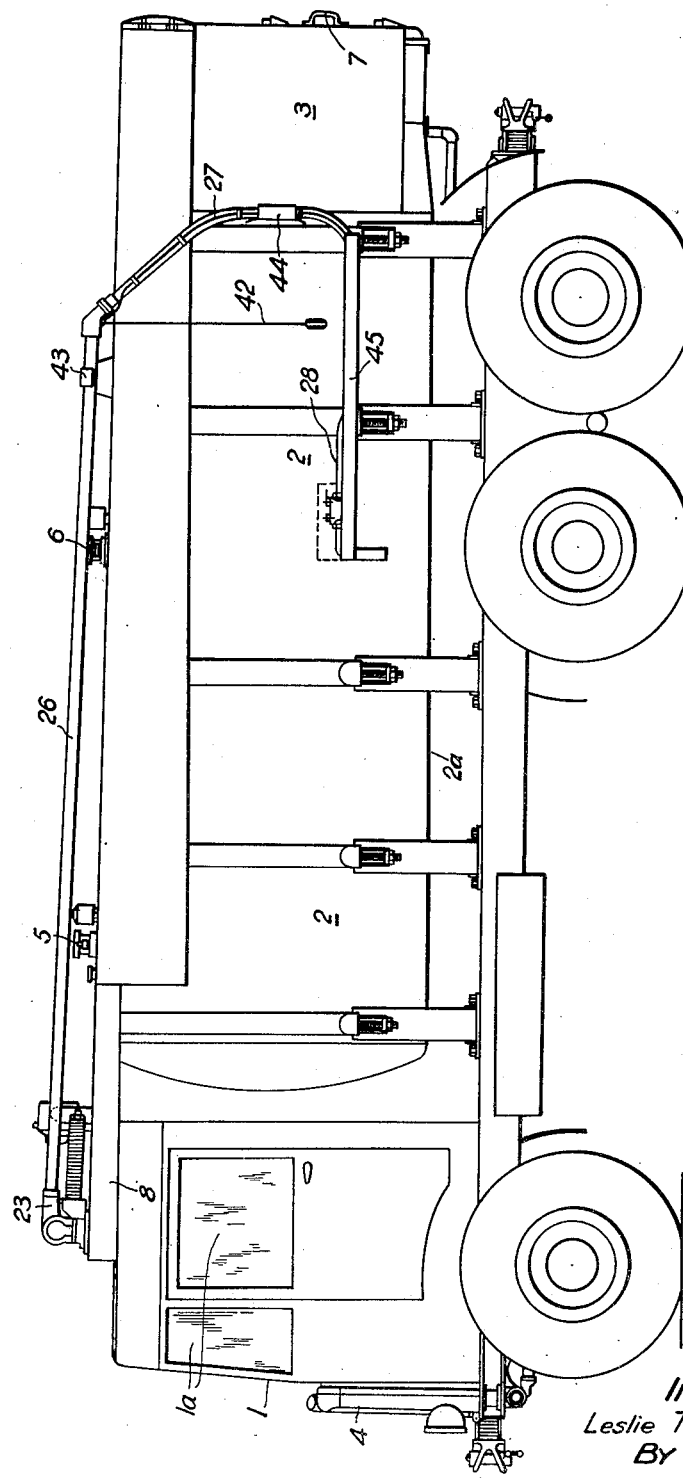
Figure 1 is a general view of the replenishing plant omitting much detail not necessary for the understanding of the invention.

Figure 1 shows diagrammatically a six-wheeled motor-driven tanker vehicle, the front part 1 of which is occupied by an engine and by a driver's cab 1a, the middle and main part 2, 2 by a tank or tanks 2a, and the rear part 3 by a pump or pumps, and the means of control. These controlling means govern the driving of the pump whether it be driven by the vehicle engine or by an independent source of power, and also govern the flow of liquid; by means of valves a pump may be used to fill a vehicle tank from an outside reservoir, to supply liquid from the vehicle tank through a boom to an aircraft, to withdraw liquid from an aircraft through a boom and return it to the vehicle tank or a separate reservoir, or to empty the vehicle tank. All these parts are known, and the invention is not affected by variations in their details, for which reason they are not fully illustrated. In Figure 1 the engine radiator may be seen at 4, manhole covers giving access to two tanks at 5 and 6, and the doors enclosing the valves and other pumping controls at 7.

The vehicle shown in Figure 1 is equipped with two hollow booms, lying parallel to each other one on each side of the vehicle above the tanks and extending over more than half the length of the vehicle. As they are both alike it will suffice to describe one of them.

Figure 4:
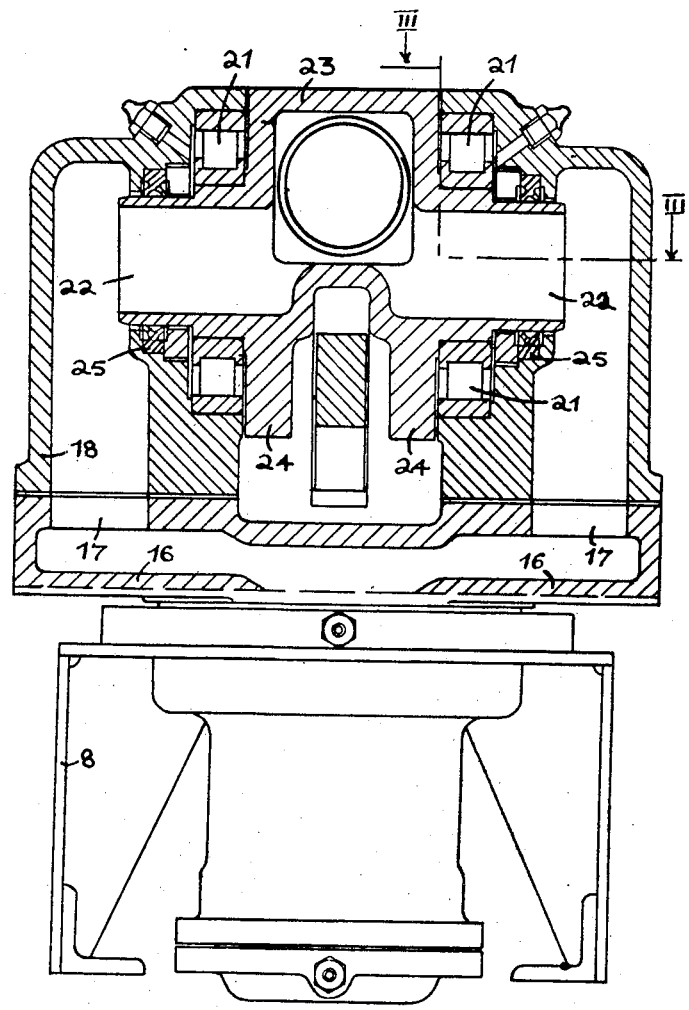
Figure 4 is an end elevation, that is an elevation at right angles to Figure 2, partly in section on the line IV—IV of Figure 2.

There is welded to the tank at its front end a stout metal housing 8, best seen in Figure 4. This supports a hollow bearing shell 9 of generally cylindrical form, in which is a lateral opening through a flanged pipe connection 10. To the pipe connection 10 is attached a fixed pipe 11 extending to the valves and pump at 3, and serving for the supply of liquid, say fuel. The bearing shell 9 is open at the top, and is closed at the bottom by a cup 12. Its top and bottom ends are enlarged to receive the outer races of ball or roller bearings 13, 14 designed to take the weight of the boom as well as to enable it to turn upon a substantially vertical axis, vertical, that is to say, when the vehicle is in a normal upright position, neither on a camber nor on a slope.

In the bearings 13, 14 there rotates a cylindrical spigot stem 15 carrying the inner races of the bearings. This is closed at its lower end and forked at its upper end. In the construction illustrated the spigot is built of three parts; the stem 15 is of T form having horizontal hollow arms 16 extending in opposite directions at its upper end; in the upper surfaces of these arms 16 are openings 17, and upon the ends of the arms are erected hollow cheeks 18 communicating with the openings 17 and constituting the prongs of the forked spigot end.

In the spigot stem 15 is provided a lateral opening, or plurality of lateral openings 19, through which the spigot connects with the aperture in the flanged pipe connection 10 and with the pipe 11. Above and below the opening or openings 19 and above and below the flanged pipe connection 10 a fluid tight joint is established between the spigot stem 15 and the bearing shell 9 by packing 20, so that lubricant from the bearings 13, 14 cannot reach the fuel, nor fuel reach the bearings.

There are lodged in the inner, adjacent faces of the hollow cheeks 18 bearings 21. These receive hollow open-ended trunnions 22 which project laterally from the boom end 23. This boom end fills the gap between the cheeks 18 and has webs 24 fitting between the lower parts of the cheeks 18 and completing the enclosure of the bearings 21. Intermediate each of these bearings and the adjacent open end of the trunnion 22 a liquid-tight joint is made between the trunnion and the cheek by packing 25.

To the boom end 23 is secured a rigid pipe 26 constituting the remainder of the hollow boom. This may terminate in a length of flexible hose 27 having a filling nozzle 28 at its end to enter the fuel tank of an aircraft.

Figure 2:
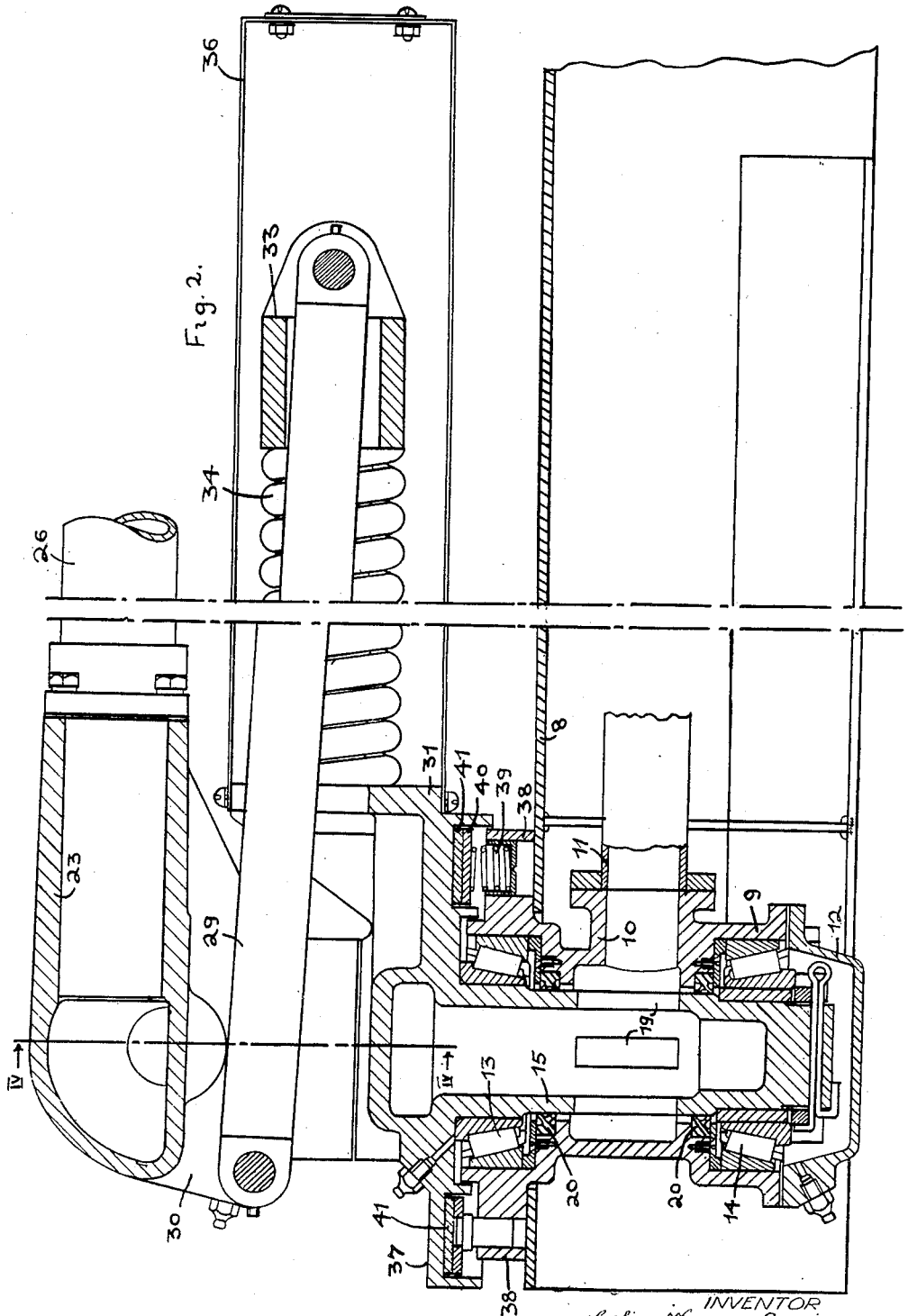
Figure 2 is a section on the line II—II of Figure 3 through the boom end and its mounting and through the spring elevator mechanism, a part of the latter being broken away to reduce the length of the figure.
Figure 3:
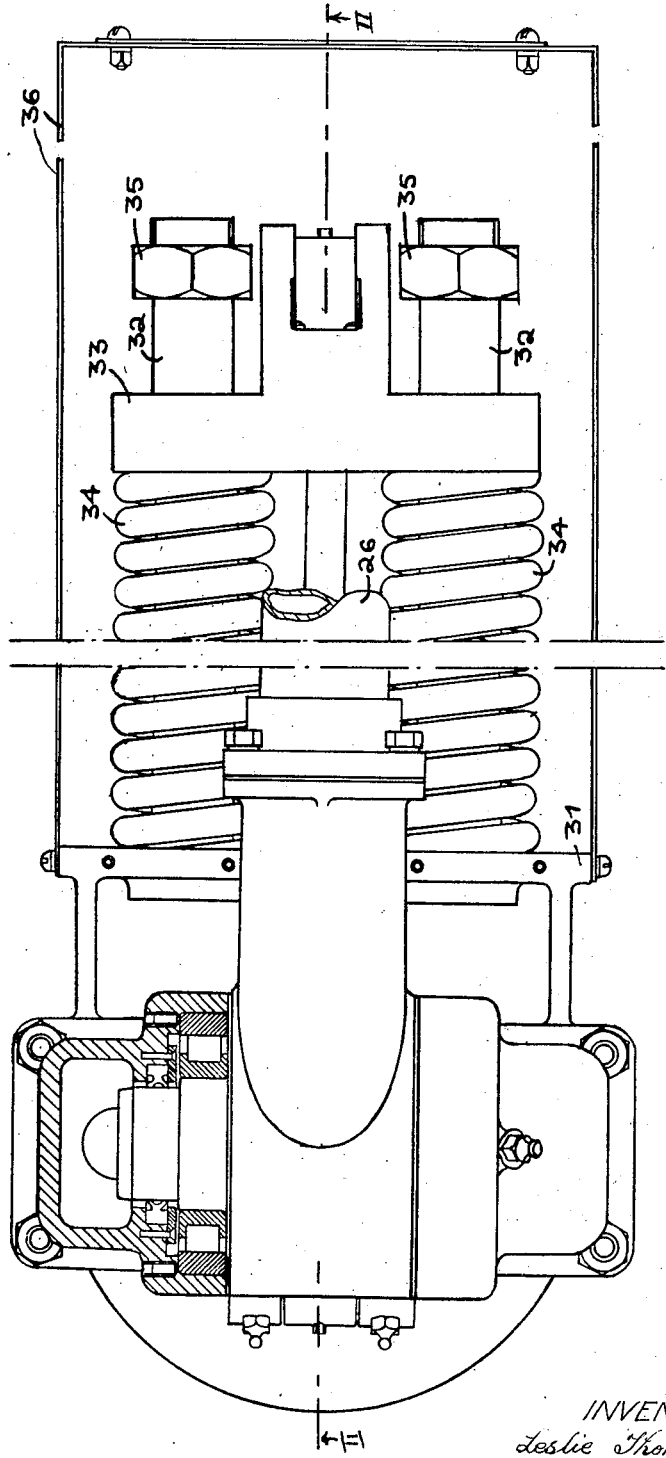
Figure 3 is a plan corresponding with Figure 2 and partly in section on the line III—III of Figure 4.

It will be clear that the construction so far described permits of the boom 23, 26 pivoting about the horizontal axis of the trunnions 22 and about the vertical axis of the spigot stem 15. When in the lowered, substantially horizontal position shown in the drawings, and especially in Figure 1, the weight of the boom has a considerable moment about the trunnion axis and without mechanical assistance its erection would be a matter of difficulty. To counterbalance the boom by a load attached to it beyond the trunnion axis would greatly increase the weight. The boom may be lifted by hydraulic means pulling upon a link 29 pivotally connected to a tail piece 30 on the boom end extending beyond its horizontal axis of rotation. In the construction illustrated, however, the pull upon the link 29 is exerted by the simpler means of a spring elevator mechanism best seen in Figures 2 and 3.

In this scheme the head of the spigot 15, 16, 18 is extended laterally to form a bracket 31 to which are attached two horizontal tubes 32. On these tubes 32 slides a cross-head 33 for which they form guides. To this cross-head the other end of the link 29 is pivotally connected. Surrounding each tube 32, and compressed between the bracket 31 and the cross-head 33, are springs 34 designed substantially to counterbalance, and preferably more than counterbalance the moment of the boom about its horizontal axis of rotation. Thus when the boom is otherwise free the springs 34 are strong enough to lift it from its horizontal position; as it rises the moment of its weight about the trunnion axis diminishes, and so also does the thrust of the springs. Provision may be made, if desired, for adjusting the pressure of the springs, and stops, such as the nuts 35 upon the tubes 32, may be provided to limit the extent of elevation of the boom. The springs, cross-head and cross-head guides are housed in a casing 36 attached to the bracket 31.

The boom has been spoken of above as rotatable about horizontal and vertical axes. It will be obvious that if the vehicle is standing on the side of a cambered road, or upon a sloping road, these axes will be inclined to the horizontal and vertical respectively, and the terms horizontal and vertical are to be understood with this qualification in mind, as well as with due regard to such slight departures from the horizontal and vertical as may result from tolerances in construction and like causes.

Such variations from the horizontal and vertical position have the result that the boom, when freed, may tend to swing under gravity, as well as under wind pressure, and provision should be made to counter any tendency.

Preferably the spigot part 15, 16 is formed with a circular flange 37, extending over a similar flange 38 upon the bearing shell 9, and provision is made for frictional engagement between these flanges. In the construction shown the flange 38 carries upon springs 39 an annulus 40 adjustable in height, and between this annulus and the flange 37 there is provided a friction lining 41.

The boom can be pulled down from its elevated position by means of a cord 42, and when pulled down it can be lodged beneath and held down by a hook 43 upon the vehicle tank. The flexible hose 27 and nozzle 28 may be snugly stowed in cleats 44 and on a bracket 45.

I claim:

1. In a travelling replenishing unit the combination with a vehicle having a tank mounted therein of a hollow shell secured upon said vehicle, a lateral pipe connection upon said shell for supplying liquid thereto from said tank, a vertical spigot closed at its lower end rotatable about its axis in said shell, means maintaining liquid-tight joints between said spigot and said shell above and below said pipe connection, lateral openings in said spigot between said liquid-tight joints, anti-friction bearings above and below said liquid-tight joint supporting said rotatable spigot in said shell, and a hollow boom mounted to rotate about a horizontal axis in said spigot and having connection therewith for the passage of liquid.

2. In a replenishing unit the combination of a hollow shell, means for supplying liquid thereto, a vertical spigot mounted to rotate about its axis in said shell and communicating in all positions with the interior of said shell for the passage of liquid, a hollow boom mounted to rotate about a horizontal axis in said spigot and having connection therewith for the passage of liquid, and spring means connecting said spigot and boom turning with said spigot and tending to rotate said boom into elevated positon.

3. In a replenishing unit the combination of a hollow shell, a lateral pipe connection upon said shell for supplying liquid thereto, a vertical cylindrical spigot closed at its lower end mounted to rotate about its axis in said shell, means maintaining liquid-tight joints between said spigot and said shell above and below said pipe connection, a lateral opening in said spigot between said liquid-tight joints, a hollow boom mounted to rotate about a horizontal axis in said spigot and having connection therewith for the passage of liquid, and spring means connecting said spigot and boom turning with said spigot and tending to rotate said boom into elevated position.

4. In a travelling replenishing unit the combination of a hollow shell, a lateral pipe connection upon said shell for supplying liquid thereto, a vertical spigot closed at its lower end inserted in said shell, anti-friction bearing for said spigot near the upper and lower ends of said shell permitting it to rotate about its axis, means maintaining liquid-tight joints between said spigot and said shell on each side of said pipe connection between it and the spigot bearings, a lateral opening in said spigot between said liquid-tight joints, and a hollow boom mounted to rotate about a horizontal axis in said spigot and having connection therewith for the passage of liquid.

5. In a travelling replenishing unit the combination of a hollow shell, means for supplying liquid thereto, a vertical spigot mounted to rotate about its axis in said shell and communicating in all positions with the interior of said shell for the passage of liquid, said spigot being of T form with openings in its upper surface at the ends of its horizontal limb, hollow cheeks secured upon said horizontal limb communicating with said spigot through said openings, trunnion bearings in the adjacent faces of said cheeks, a boom end having hollow open-ended trunnions projecting laterally from the lower end thereof mounted in said bearings, and means for maintaining a liquid-tight joint between said trunnions and said cheeks intermediate the open ends of said trunnions and the bearings supporting them.

6. In a replenishing unit the combination of a shell, a spigot mounted in said shell to rotate about a substantially vertical axis, a hollow boom, bearings for said boom in spigot permitting it to rotate about a horizontal axis, a tail piece on said boom projecting beyond and below its horizontal axis of rotation, a cross-head guide extending horizontally from said spigot, a cross-head sliding in said guide, spring means compressed between said spigot and said cross-head, and a link connecting said cross-head with said tail piece of the boom.

7. In a travelling replenishing unit the combination with a vehicle having a driver's cab and a tank together occupying the whole length of the vehicle, of a housing above said tank and cab, a hollow bearing shell mounted at the front end of said housing adjacent the front end of the vehicle, a substantially vertical spigot rotatably mounted in said shell, a boom having bearings in said spigot permitting it to rotate about a horizontal axis and having a tail piece projecting beyond and below said axis, a bracket extending laterally from said spigot, and spring means connecting said tail piece and said bracket tending to lift the boom.

8. In a travelling replenishing unit the combination of a hollow shell, means for supplying liquid thereto, a vertical spigot mounted to rotate about its axis in said shell and communicating in all positions with the interior of said shell for the passage of liquid, a hollow boom mounted to rotate in said spigot about a horizontal axis near the end of the boom and having connection with said spigot for the passage of liquid, and laterally extending spring means interposed in compression between said spigot and the end of said boom beyond the horizontal axis on which the boom rotates.

9. In a travelling replenishing unit the combination with a motor-driven vehicle having a tank mounted thereon, of a hollow boom more than half the length of the vehicle, a hollow liquid-conveying mounting for said boom upon said vehicle, anti-friction bearings in said mounting permitting said boom to turn about a vertical axis and about a horizontal axis at the end of the boom and at the level of the top of said tank, liquid-tight packing separating said bearings from the liquid-conveying interior of said mounting, means for supplying liquid to said hollow mounting and through it to said boom, and balancing means swinging with the boom about its vertical axis of swing tending to rotate said boom into an elevated position.

10. In a replenishing unit the combination of a hollow boom, a liquid-conveying mounting for said boom including a fixed part and a part rotatable about a vertical axis relatively to said fixed part, in which rotatable part the boom is pivoted about a horizontal axis, means for supplying liquid to said boom through said mounting, and horizontal spring means acting between said rotatable part of the mounting and the boom end, turning with said rotatable part, and tending to rotate said boom into an elevated position.

11. In a replenishing unit the combination of a hollow shell, a lateral pipe connection upon said shell for supplying liquid thereto, a vertical spigot closed at its lower end rotatable about its axis in said shell, means maintaining liquid-tight joints between said spigot and said shell above and below said pipe connection, a lateral opening in said spigot between said liquid-tight joints, anti-friction bearings above and below said liquid-tight joints supporting said rotatable spigot in said shell, a hollow boom mounted to rotate about a horizontal axis in said spigot and having connection therewith for the passage of liquid, and spring means turning with said spigot connecting said spigot and boom and tending to rotate said boom into elevated position.

12. In a travelling replenishing unit the combination of a hollow boom, a mounting for said boom including a fixed part and a part rotatable relatively thereto about a vertical axis, said rotatable part supporting the end of the boom rotatably upon a horizontal axis, a friction member spring-supported upon said fixed part and pressed into engagement with said rotatable part, and means tending to rotate said boom into an elevated position.

13. In a travelling replenishing unit the combination of a hollow boom, a mounting for said boom including a fixed part and a part rotatable relatively thereto about a vertical axis, said rotatable part supporting the end of the boom rotatably upon a horizontal axis, said fixed and rotatable parts presenting juxtaposed annular surfaces, a ring spring-supported upon one of said surfaces and pressed into engagement with the other, and means tending to rotate said boom into an elevated position.

LESLIE THOMAS SPURIN.

REFERENCES CITED

The following references are of record in the file of this patent:

UNITED STATES PATENTS

| Number | Name | Date |
|---|---|---|
| 596,669 | Twining | Jan. 4, 1898 |
| 608,192 | Glazier et al. | Aug. 2, 1898 |
| 1,412,100 | Canaday | Apr. 11, 1922 |
| 1,556,397 | Bacher | Oct. 6, 1925 |
| 1,599,105 | Tolle et al. | Sept. 7, 1926 |
| 1,599,907 | MacGregor | Sept. 14, 1926 |
| 1,640,417 | Marks | Aug. 30, 1927 |
| 1,644,972 | Zeitter | Oct. 11, 1927 |
| 1,835,896 | Phillip | Dec. 8, 1931 |
| 1,848,436 | Shaw | Mar. 8, 1932 |
| 1,971,555 | Fox | Aug. 28, 1934 |
| 1,984,360 | Corley | Dec. 18, 1934 |
| 2,147,292 | Hachmuth | Feb. 14, 1939 |

FOREIGN PATENTS

| Number | Country | Date |
|---|---|---|
| 393,855 | France | Nov. 10, 1908 |
| 310,355 | Italy | Aug. 11, 1933 |